United States Patent
Griepentrog et al.

(10) Patent No.: US 6,667,596 B1
(45) Date of Patent: Dec. 23, 2003

(54) METHOD AND DEVICE FOR CONTROLLING DECELERATION IN AN INDUCTION MACHINE

(75) Inventors: Gerd Griepentrog, Gutenstetten (DE); Diethard Runggaldier, Stegaurach (DE)

(73) Assignee: Siemens AG, Munich (DE)

(*) Notice: Subject to any disclaimer, the term of this patent is extended or adjusted under 35 U.S.C. 154(b) by 0 days.

(21) Appl. No.: 09/868,060
(22) PCT Filed: Dec. 10, 1999
(86) PCT No.: PCT/DE99/03954

§ 371 (c)(1),
(2), (4) Date: Jun. 14, 2001

(87) PCT Pub. No.: WO00/36741

PCT Pub. Date: Jun. 22, 2000

(30) Foreign Application Priority Data

Dec. 14, 1998 (DE) .......................................... 198 57 695

(51) Int. Cl.[7] .................................................. H02P 5/28
(52) U.S. Cl. ........................ 318/727; 318/729; 318/757
(58) Field of Search ................................ 318/727, 729, 318/757

(56) References Cited

U.S. PATENT DOCUMENTS 4,430,607 A * 2/1984 Muth ........................ 323/217
5,684,377 A 11/1997 Kim et al. ................... 318/799
5,825,154 A * 10/1998 Runggaldier et al. ....... 318/757

FOREIGN PATENT DOCUMENTS

| EP | B1 0454697 | 1/1990 |
| EP | A2 0435038 | 12/1990 |
| EP | B1 0742970 | 1/1994 |
| GB | A 2149536 | 6/1985 |

OTHER PUBLICATIONS

Venkata V. Sastry et al.: IEEE Transactions power electronics, vol. 12, No. 6 Nov. 1997 pp 1041–1051.

* cited by examiner

*Primary Examiner*—Rita Leykin
(74) *Attorney, Agent, or Firm*—Harness, Dickey & Pierce, P.L.C.

(57) ABSTRACT

In order to control the run-down of an induction machine, whose stator is connected to a singe-phase or polyphase AC main power supply system via an AC power controller which can be controlled by phase gating, a phase gating angle is first increased in steps until an operating point is reached, which is defined on the basis of predetermined criteria. The phase gating angle is then controlled in order to ensure that the induction machine runs down in accordance with a predetermined control program.

11 Claims, 2 Drawing Sheets

METHOD AND DEVICE FOR CONTROLLING DECELERATION IN AN INDUCTION MACHINE

This application is the national phase under 35 U.S.C. § 371 of PCT International Application No. PCT/DE99/03954 which has an International filing date of Dec. 10, 1999, which designated the United States of America.

FIELD OF THE INVENTION

The invention relates to a method and a device for controlling the run-down of an induction machine whose stator is connected to a single-phase or polyphase AC main power supply system via an AC power controller which can be controlled by phase gating.

BACKGROUND OF THE INVENTION

In order to match the electrical power supply of an induction machine to the respective load conditions at that time, in particular during starting and during the run-down, it is known, for example from EP 0 454 697 B1, for a microprocessor-controlled AC power controller or soft starter to be used, which operates on the phase gating principle. This microprocessor-controlled. AC power controller is used essentially for smooth starting and run-down of three-phase asynchronous machines. Three sets of active devices, in general each comprising two back-to-back parallel-connected thyristors, are generally driven by a microprocessor for this purpose.

Such a microprocessor-controlled AC power controller can now be used to ensure that the three-phase asynchronous machine runs down in a manner matched to the respective application by means of suitable control programs. Thus, for example when operating a pump, it is possible to reduce or avoid the surge in water pressure caused when the pump is switched off directly by closing the non-return valve.

For a smooth run-down, the phase gating angle is now increased, and the terminal voltage thus reduced, starting from a phase gating angle of 0°, that is to say starting from an operating situation in which the entire mains voltage is applied to the stator terminals of the asynchronous machine. However, the squirrel-cage rotors which are generally used initially react to this by increasing the current drawn, but not by reducing the torque. In this operating range, which is referred to as the shunt range, it is virtually impossible to influence or control the operation of the asynchronous machine using a three-phase power controller. Only when the terminal voltage is reduced further as a result of an increasing phase gating angle is the torque characteristic reduced sufficiently that the stalling torque virtually matches the torque required by the load. From this time, the asynchronous machine reacts sensitively such that changes in the terminal voltage or in the phase gating angle result in torque fluctuations, so that a further reduction in the terminal voltage is associated with the risk of the asynchronous machine stopping abruptly.

EP 0 435 038 A2 describes a three-phase motor having a three-phase power controller, and an associated control method for starting and stopping the drive, in which the aim is to achieve smooth starting and run-down, in particular for pump drives. In the method described there, a phase gating angle is increased in steps until the changeover point, which is defined by comparison of the mathematical signs of the voltages, is reached. The triggering time is established by determining the phase shift between the current and voltage, and the motor then runs down controlled in accordance with a control program.

In U.S. Pat. No. 5,684,377, an asynchronous motor having a three-phase controller is controlled in accordance with a flowchart in which the trigger angle is increased or decreased in steps. Smoothing is carried out by calling up stored values for the electronic power at various times and by sum formation, with a maximum power factor still being achieved by increasing or decreasing the trigger angle.

A corresponding situation arises in the publication in "IEEE Transactions on Power Electronics", 1997, Volume 6, pages 1041 to 1051, in which the trigger angle is likewise varied in steps, and the aim is to achieve maximum efficiency. Finally, GB 21 49 536 A describes the trigger angle for an asynchronous motor being varied in steps, in order to minimize the amount of energy consumed.

Furthermore, EP 0 742 970 B1 discloses a method in which the phase angle is used for controlling the run-down of an induction machine, and the phase angle is itself regulated, after detection of its minimum, to a specific nominal phase angle value.

SUMMARY OF THE INVENTION

An object of the invention is to specify a device for controlling the run-down of an induction machine, in which the risk of undesirable, sudden stopping of the induction machine is largely avoided. Furthermore, the invention is based on an object of specifying a device for controlling the run-down of an induction machine.

According to the invention, these and other objects are achieved by the sequence of the method steps alternatively in claim 1 or claim 2. Developments are specified in the dependent method claims.

The invention is in this case based on the idea that the control program which is provided for the run-down of the induction machine and is matched to the respective application should not be carried out until the induction machine has reached an operating state which forms a suitable starting point for the predetermined control program and allows the induction machine to be run down without any disturbances, and without the risk of stopping abruptly.

The measurement of the phase shift between the terminal voltage and the terminal current after each increase in the phase gating angle, as provided according to the invention, provides the information on the operating state of the induction machine required to determine a suitable starting point. The alternative choice, according to the invention, of the minimum phase shift or a predetermined time interval after reaching the minimum phase shift as the operating point results in a suitable operating state as the operating point or starting point for the control program which is provided for a smooth run-down. This procedure is based on the idea that the best starting point for commencement of the predetermined control program occurs when the wattless component is at its minimum. At this time, an operating state is reached in which the induction machine reacts sensitively to a control process. This also ensures that the operating conditions at the start of the control program which is responsible for smooth run-down, are always the same.

In one advantageous refinement of the method, the phase gating angle is increased in equidistant angular steps until the operating point is reached. This can be done particularly easily.

The angular step is preferably >1° and is, in particular, between 1.5° and 2°. This ensures that the operating point can be reached sufficiently accurately, and in a relatively short time.

In particular, the phase gating angle is increased after each main cycle. This allows the operating point to be reached quickly.

In a further particularly preferred refinement of the invention, the phase shift determined in each main cycle is subjected to digital smoothing, in order to avoid incorrect detection of the intended operating point as a result of transient disturbances.

Another object is achieved by a device having the features of patent claim 8. The device for carrying out the methods according to the invention contains a control device for increasing the phase gating angle in steps until a predetermined operating point is reached, and for subsequently controlling the phase gating angle in order to ensure that the induction machine runs down in accordance with a predetermined control program.

BRIEF DESCRIPTION OF THE DRAWINGS

The invention will be explained further with reference to the exemplary embodiment in the drawing, in which.

DETAILED DESCRIPTION OF THE PREFERRED EMBODIMENTS

Figure 1:
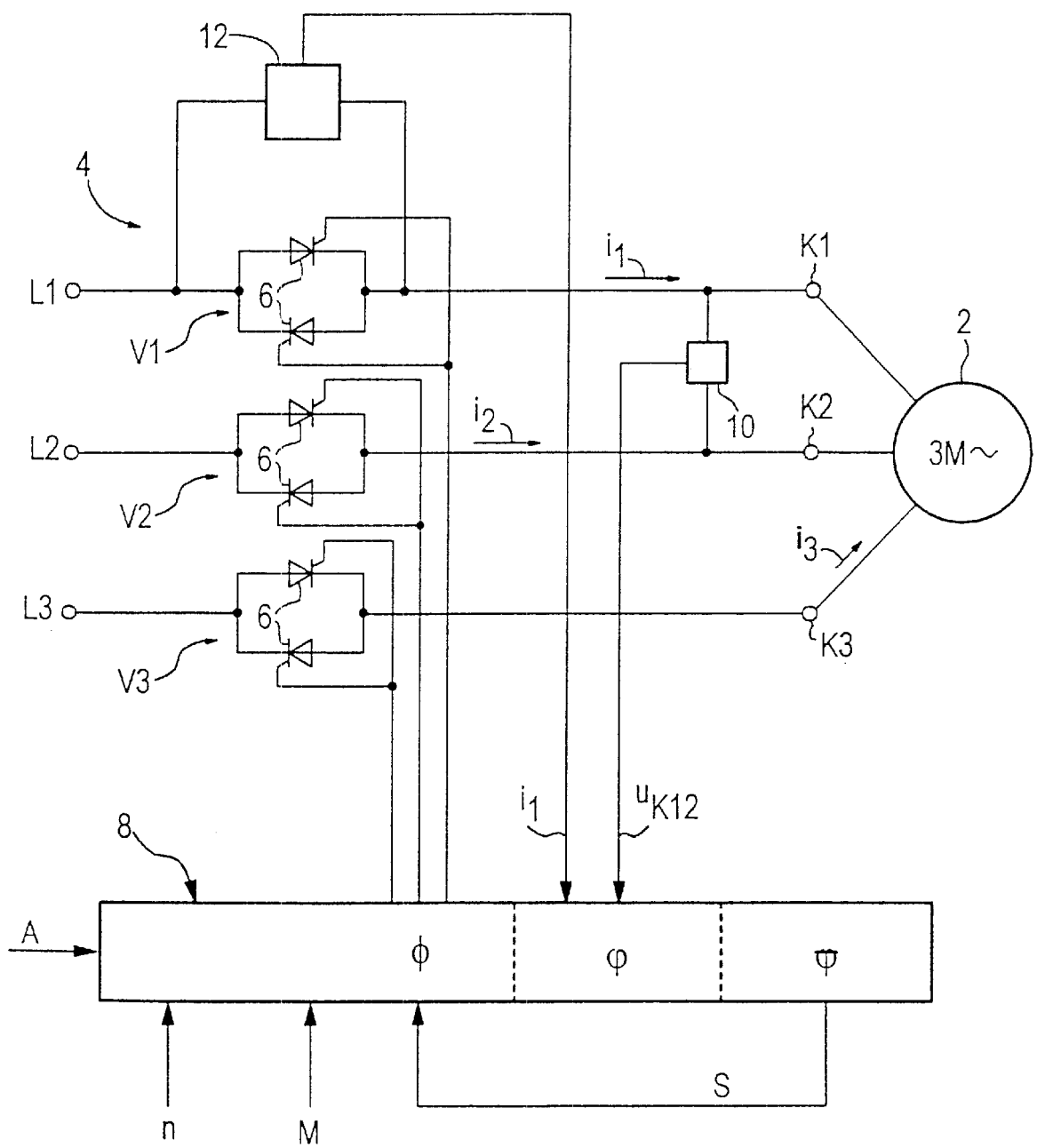
FIG. 1 shows a schematic block diagram of a device according to the invention.

According to FIG. 1, an induction machine 2, for example a three-phase asynchronous machine, is connected via a three-phase AC power controller 4, which is also referred to as a three-phase power controller, to the phases L1, L2, L3 of a three-phase main system. Each phase L1, L2, L3 has an associated active device arrangement V1, V2, V3, with the individual active device arrangements V1, V2, V3 in the exemplary embodiment each comprising two back-to-back parallel-connected thyristors 6. The trigger electrodes of the thyristors 6 are connected to a control device 8, by means of which the trigger signals required to trigger the thyristors 6 are provided in a predetermined time sequence.

A voltage measurement device 10 is connected between two stator terminals, in the example between the stator terminals K1 and K2 of the induction machine 2, and the terminal voltage $U_{K12}$ that occurs between these two stator terminals K1, K2 appears at the output of this voltage measurement device 10. A current measurement device 12 produces a measurement signal S which is dependent on the terminal current $i_1$ and from which the time of the zero crossing of the terminal current $i_1$ flowing to the stator terminal K1 can be derived.

For this purpose, it is sufficient to detect the terminal current $i_1$ indirectly by means of the voltage drop across the active device set V1 associated with this stator terminal. One of the other stator terminal currents $i_{2,\ 3}$ and a terminal voltage $U_{K23,\ 13}$ associated with it can also be detected, instead of the stator terminal current $i_1$.

The instantaneous phase shift $\phi$ between the terminal voltage $U_{K12}$ and the terminal current $i_1$ is measured in the control device 8 and is subjected to further processing:

Using the control device 8 and when a switch-off signal A is being input, the phase gating angle $\phi$ is first of all increased in steps, preferably at intervals of one main cycle, by a constant angle step $\Delta\phi$, for example approximately 1° to 3°. The phase shift $\phi$ or the phase angle is now measured after each increase. The symbols in the following text have the following meanings:

| | |
|---|---|
| $\phi$ | phase shift |
| $\bar{\phi}$ | mean value of the phase shift |
| $\phi_{min}$ | minimum phase shift |
| $n_M$ | counter |
| $n_{lim}$ | counter limit value |

The phase shift $\phi_n$ measured in the n-th step is now used in a microcontroller contained in the control device 8 to produce a new mean value $\bar{\phi}_n$ in each case from a mean value $\bar{\phi}_{n-1}$, which was derived from the previous measurement and was stored, using the following equation:

$$\overline{\varphi_n} = \frac{3 * \overline{\varphi}_{n-1} + \varphi_n}{4} \quad (1)$$

This results in digital smoothing in order to suppress random fluctuations. At the starting point (n=0), the settings $\bar{\phi}_0 = \phi_0$ and $\phi_{min} = \phi_0$ are introduced.

If the condition $\bar{\phi}_n < \bar{\phi}_{min}$ is now satisfied, then $\phi_{min} = \bar{\phi}_n$ and the value for the counter $n_M$ is set to 0, $n_M = 0$. Otherwise, $n_M$ is incremented by 1, $n_M = n_M + 1$. If $n_M$ then exceeds a predetermined limit value $n_{lim}$, which is about 3 to 5 in the exemplary embodiment, then this provides confidence that the minimum phase shift $\phi_{min}$ has been found. The counter $n_M$ thus does not start to run until it is for the first time found after an increase in the phase gating angle $\phi$ that the present mean value of the phase shift $\bar{\phi}$ determined using equation (1) is greater than the previous mean value. Since, despite the digital smoothing carried out using equation (1), it is impossible to preclude the possibility of this being a measurement error caused by a random disturbance, for example a load fluctuation, the process of reducing the phase gating angle $\phi$ in steps is still continued until the criterion $n_M > n_{lim}$ provides confidence that the mean value of the phase shift $\bar{\phi}$ determined $n_{lim}$ steps previously actually was the minimum.

The induction machine 2 is now in a state or at an operating point from which the run-down can be carried out using a predetermined control program stored in the control device 8. An internally produced start signal S in the control device 8 then initiates a predetermined sequence for the run-down process. For this purpose, it may also be necessary or advantageous to detect further measurement data relating to the operating state of the induction machine 2, for example its rotation speed n or its torque M, and to use this for a regulated run-down in the course of the control program.

Figure 2:
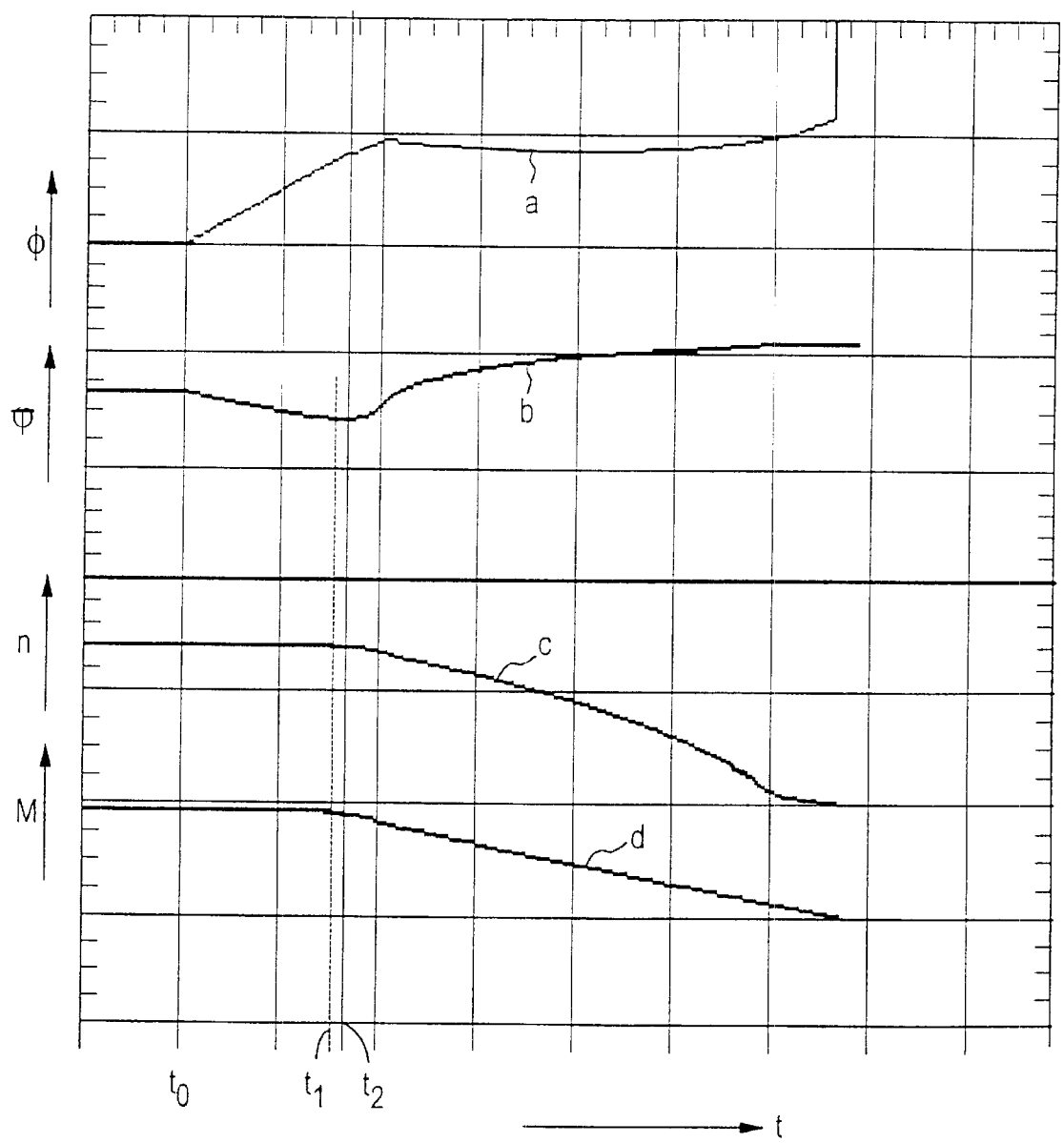
FIG. 2 is a diagram in which the phase gating angle, the phase shift, the rotation speed and the torque are plotted against time, in each case using arbitrary units.

According to FIG. 2, the run-down of the induction machine is started when a switch-off signal A is present at a time $t_0$. It can be seen from the curve a that the phase gating angle $\phi$ is increased linearly starting from 0°, that is to say with equidistant angular steps $\Delta\phi$ at equidistant time intervals $\Delta t$. Curve b shows that the phase shift $\bar{\phi}$ prior to the time $t_0$ was approximately constant and decreases successively from $t_0$, reaching a flat minimum at the time $t_1$. Prior to this time $t_1$, the rotation speed shown by the curve c and the torque of the induction machine shown by the curve d remain approximately constant. From the time $t_2 = t_1 + (n_{lim} + 1) * \Delta t$, the phase gating angle $\phi$ is now controlled such that the rotation speed n and the torque M decrease successively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling the run-down of an induction machine whose stator is connected to an AC main power supply via an AC power controller which can be controlled by phase gating, comprising:

increasing a phase gating angle in steps until an operating point is reached, which is defined at a predetermined time interval after reaching a minimum phase shift;

measuring, in order to determine that the operating point has been reached, the phase shift between a terminal voltage and a terminal current, after each increase in the phase gating angle; and controlling the phase gate angle, from the operating point which has been set in a defined manner, in order to ensure that the induction machine runs down in accordance with a predetermined control program.

2. The method as claimed in claim 1, wherein the phase gating angle is increased after each main cycle.

3. A device for controlling run-down of an induction machine whose stator is connected to an AC main power supply system via an AC power controller which can be controlled by phase gating, comprising:

a control device for increasing a phase gate angle in steps until an operating point is reached, the operating point being defined at predetermined time interval after reaching a minimum phase shift, and for subsequently controlling the phase gating angle in order to ensure that the induction machine runs down in accordance with a predetermined control program.

4. The method as claimed in claim 1, wherein the phase gating angle is increased in equidistant angular steps until the operating point is reached.

5. The method as claimed in claim 4, wherein the angular steps are between 1.5° and 2°.

6. The method as claimed in claim 5, wherein the measured phase shift is subjected to digital smoothing.

7. The method as claimed in claim 1, wherein the phase gating angle is increased after each main cycle.

8. The method as claimed in claim 5, wherein the phase gating angle is increased after each main cycle.

9. The method as claimed in claim 5, wherein the phase gating angle is increased after each main cycle.

10. The device of claim 3, wherein the stator is connected to a single-phase AC main power supply system.

11. The device of claim 3, wherein the stator is connected to a polyphase AC main power supply system.

* * * * *